US012757175B2

(12) United States Patent
Li et al.

(10) Patent No.: US 12,757,175 B2
(45) Date of Patent: Oct. 6, 2026

(54) AD-HOC WIRELESS COMMUNICATION

(71) Applicant: NEWSOUTH INNOVATIONS PTY LIMITED, Sydney (AU)

(72) Inventors: Binghao Li, Sydney (AU); Kai Zhao, Sydney (AU); Henry Gong, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 283 days.

(21) Appl. No.: 18/682,350

(22) PCT Filed: Aug. 9, 2022

(86) PCT No.: PCT/AU2022/050867
§ 371 (c)(1),
(2) Date: Feb. 8, 2024

(87) PCT Pub. No.: WO2023/015342
PCT Pub. Date: Feb. 16, 2023

(65) Prior Publication Data

US 2024/0381328 A1 Nov. 14, 2024

(30) Foreign Application Priority Data

Aug. 9, 2021 (AU) ................................ 2021902460

(51) Int. Cl.
*H04W 72/0446* (2023.01)
*H04W 56/00* (2009.01)
(Continued)

(52) U.S. Cl.
CPC ... *H04W 72/0446* (2013.01); *H04W 56/0015* (2013.01); *H04W 72/563* (2023.01); *H04W 84/18* (2013.01)

(58) Field of Classification Search
CPC ......... H04W 72/0446; H04W 56/0015; H04W 72/563; H04W 84/18; H04W 4/023;
(Continued)

(56) References Cited

U.S. PATENT DOCUMENTS

2004/0028018 A1* 2/2004 Cain ..................... H04L 1/0041 370/347
2004/0032847 A1* 2/2004 Cain ....................... H04L 1/203 370/347
(Continued)

OTHER PUBLICATIONS

"International Search Report and Written Opinion of the International Searching Authority", International Application No. PCT/AU2022/050867, Oct. 12, 2022, 11 pp.
(Continued)

*Primary Examiner* — Abdullahi E Salad
(74) *Attorney, Agent, or Firm* — Myers Bigel, P.A.

(57) ABSTRACT

The present disclosure provides a method of transmitting and receiving data between devices via an ad-hoc wireless communication network. The ad-hoc wireless network uses a time frame having time slots, each of the time slots is assignable to one of the devices so that a device assigned to a time slot transmits and receives the data at the assigned time slot. The present disclosure also provides that the time frame is created by one of the devices.

15 Claims, 11 Drawing Sheets

(51) Int. Cl.
*H04W 72/563* (2023.01)
*H04W 84/18* (2009.01)

(58) Field of Classification Search
CPC ........... H04W 4/33; H04W 4/40; H04W 4/80; H04W 56/002; H04W 74/04; G01S 13/0209; G01S 7/0235; G01S 13/765; G01S 11/02; G06F 11/30; G06F 11/07; H04B 7/2643; H04J 3/0652
See application file for complete search history.

(56) References Cited

U.S. PATENT DOCUMENTS

2009/0279496 A1* 11/2009 Raissi-Dehkordi ... H04W 16/04 370/329
2012/0008542 A1 1/2012 Koleszar et al.
2012/0207062 A1* 8/2012 Corbellini ............. H04W 74/08 370/256
2019/0132906 A1* 5/2019 Truong ............. H04W 52/0206

OTHER PUBLICATIONS

Cao, Yanjun , et al., "Distributed TDMA for Mobile UWB Network Localization", IEEE Internet of Things Journal, vol. 8, No. 17, Sep. 1, 2021, pp. 13449-13464.
Li, Baozhu , et al., "MAC-AC: A Novel Distributed MAC Protocol for Accessing Channel in Vehicular Ad Hoc Networks", 2020 IEEE 92nd Vehicular Technology Conference (VTC2020-Fall), Nov. 18, 2020, 5 pp.

* cited by examiner

AD-HOC WIRELESS COMMUNICATION

RELATED APPLICATIONS

The present application is a 35 U.S.C. § 371 national stage application of PCT Application No. PCT/AU2022/050867, filed on Aug. 9, 2022, which itself claims the benefit of and priority to Australian Patent Application No. 2021902460, filed Aug. 9, 2021, the contents of both of which are incorporated herein by reference in their entireties. The above-referenced PCT International Application was published in the English language as International Publication No. WO 2023/015342 A1 on Feb. 16, 2023.

TECHNICAL FIELD

The present invention relates generally to wireless communication and, in particular, to an ad-hoc wireless communication system.

BACKGROUND

Ultra-wideband (UWB) is a wireless communication technology that uses a very low energy level for short-range, high-bandwidth communications. Devices using UWB operate under the same radio-frequency configuration (such as frequency band, coding, modulation, etc.). When these UWB devices are used at the same location, two transmitted UWB signals overlapping in time results in signal collision.

To overcome the problem of signal collision, a mechanism called ALOHA is used. The ALOHA mechanism enables UWB devices to transmit UWB signals without any coordination. If a signal collision is detected, then a UWB device resends the UWB signals. However, the ALOHA mechanism is not effective in overcoming this problem when the number of UWB devices increases.

The ALOHA mechanism has a communication success rate of 97% when only 18% of the air is utilized. For example, in a time frame of 10 seconds, only 1.8 second of that time frame can be used to ensure that communication between the UWB devices is successful 97% of the time. This means 82% of the time is unused.

In another conventional solution, a server is deployed to coordinate when each UWB device can transmit UWB signals. However, this conventional solution is inappropriate in certain circumstances.

SUMMARY

It is an object of the present invention to substantially overcome, or at least ameliorate, one or more disadvantages of existing arrangements.

Disclosed is a method of establishing an ad-hoc UWB communication method which seek to address the above problems.

According to an aspect of the present disclosure, there is provided a method of transmitting and receiving data between devices via an ad-hoc wireless communication network, the ad-hoc wireless network using a time frame having time slots, each of the time slots is assignable to one of the devices so that a device assigned to a time slot transmits and receives the data at the assigned time slot, the time frame being created by one of the devices.

According to another aspect of the present disclosure, there is provided a computer program product executable by a processor, the computer program product comprising a method of transmitting and receiving data between devices via an ad-hoc wireless communication network, the ad-hoc wireless network using a time frame having time slots, each of the time slots is assignable to one of the devices so that a device assigned to a time slot transmits and receives the data at the assigned time slot, the time frame being created by one of the devices.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects are also disclosed.

BRIEF DESCRIPTION OF THE DRAWINGS

At least one embodiment of the present invention will now be described with reference to the drawings and appendices, in which.

DETAILED DESCRIPTION

Figure 1:
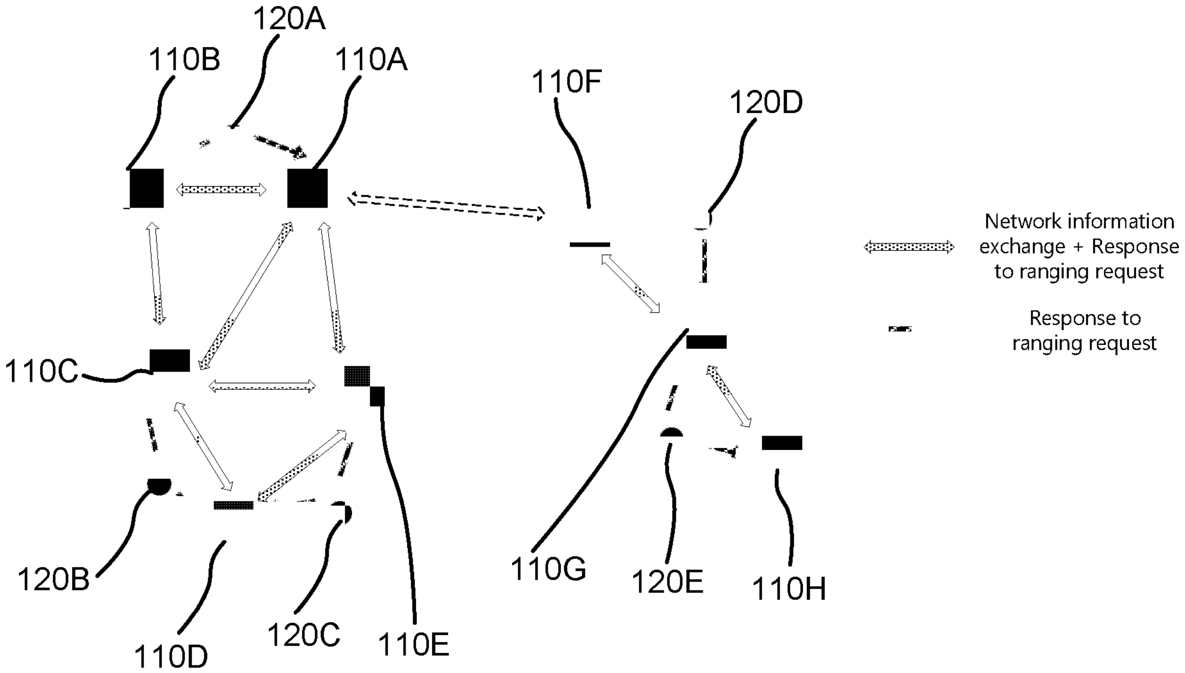
FIG. 1 shows a system of UWB devices according to the present disclosure.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

FIG. 1 shows a system 100 having initiators 110A to 110H and responders 120A to 120E. The system 100 will be described in relation to a mining environment having underground mining vehicles and miners, where the underground mining vehicles are equipped with initiators 110A to 110H and the miners are equipped with the responders 120A to 120E. More than one initiators 110A to 110H may be disposed on an object. For example a large mining vehicle may be equipped with more than one initiators 110A to 110H.

Hereinafter, the initiators 110A to 110H will be collectively referred to as the initiators 110 while the responders 120A to 120E will be collectively referred to as the responders 120. When referring to a single initiator, the term the initiator 110 or a specific number 110A to 110H will be used. When referring to a single responder, the term the responder 120 or a specific number 120A to 120E will be used.

Although 8 initiators 110 and 5 responders 120 are shown in FIG. 1, there may be more initiators 110 and responders 120. Similarly, there may be less initiators 110 and responders 120 than those shown in FIG. 1.

The initiators 110 and responders 120 are UWB devices that are capable of wirelessly communicating with each other using UWB technology. FIG. 1 shows that an initiator 110 (e.g., initiator 110A) communicates with certain other initiators 110 (e.g., initiators 110B, 110C, and 110E) as these other initiators 110 (e.g., initiators 110B, 110C, and 110E) are within the range of the initiator 110A. However, the initiator 110A is capable of communicating with other initiators 110D, 110F, 110G, and 110H when these other initiators 110D, 110F, 110G, and 110H come into communication range of the initiator 110A (as indicated by the broken lines between the initiators 110A and 110F). Unlike conventional arrangements such as the ALOHA mechanism, the initiators 110 and responders 120 transmit UWB signals at predetermined times, thereby preventing signal collision from occurring. As can be seen in FIG. 1, the present disclosure does not use a central server to coordinate the transmission of the UWB signals by the initiators 110 and responders 120.

Similar to the communication between initiators 110, the responders 120 also communicate with any of the initiators 110 when the responders 120 come into communication range of any one of the initiators 110. Further, although FIG. 1 shows only the communication going from a responder 120 to an initiator 110, the initiator 110 transmits communication signals (e.g., a ranging request) to the responder 120. The communication between an initiator 110 and other initiators 110 or responders 120 will be discussed hereinafter.

Figure 2A:
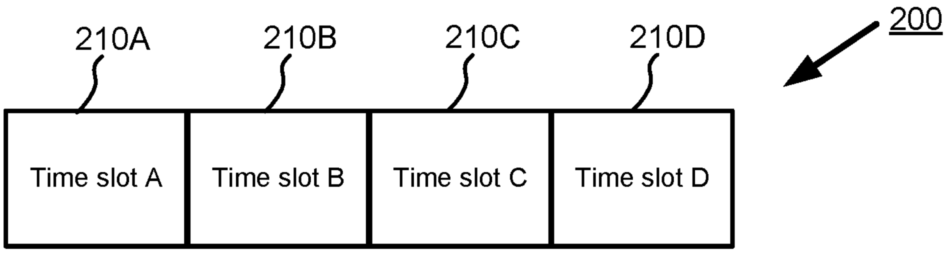
FIGS. 2A to 2D show the components within a time frame according to the present disclosure.

The transmission of UWB signals by the initiators 110 and responders 120 is managed by a time frame 200, as shown in FIG. 2A. Each of the initiators 110 maintains the time frame 200. The time frame 200 is a time period in which signals indicating a usage plan of time-space can be transmitted. The time period spans between 40 and 320 ms.

The time frame 200 is divided into different time periods called time slots 210A to 210D. Hereinafter, the time slots 210A to 210D will be collectively referred to as the time slots 210. When referring to a single time slot, the term the time slot 210 or a specific number 210A to 210D will be used. Although only four time slots 210A to 210D are shown in the time frame 200, there can be more time slots 210. In one arrangement, the number of time slots 210 vary between 4 and 16. A time slot 210 is a span of time period in which an initiator 110 can transmit a UWB signal, to which other initiators 110 and the responders 120 respond. A time slot 210 is assigned to one initiator 110 to prevent signal collision from occurring. Each time slot 210 spans a time period of 10 to 20 ms. A time slot 210 can be unassigned, meaning no UWB signal is transmitted during an unassigned time slot 210.

The time frame 200 shown in FIG. 2A is one cycle of transmission of UWB signals. The time frame 200 repeats once a previous time frame 200 is completed.

Figure 2B:
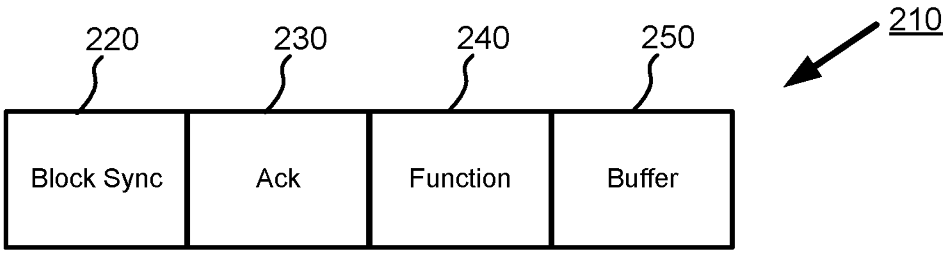

FIG. 2B shows that each time slot 210 is divided into four time periods, namely a block sync message 220, ack 230, function 240, and buffer 250. FIG. 2B is not drawn to scale, and the block sync message 220, ack 230, function 240, and buffer 250 do not have the same time period.

The block sync message 220 is the time period in which a block sync message is sent by the initiator 110 assigned to the time slot 210. The ack 230 is the time period in which the surrounding responders 120 and initiators 110 send acknowledgement messages after receiving the block sync message 220 transmitted at the block sync message time period 220. The function 240 is the time period in which the initiator 110 assigned to the time slot 210 performs an action. The buffer 250 is a time period buffering the current time slot (e.g., time slot 210A) from the next time slot (e.g., time slot 210B).

The acknowledgement messages (sent by the surrounding initiators 110 and responders 120 during ack 230) include the identification numbers of those surrounding initiators 110 and responders 120. The acknowledge messages enable the initiator 110 (which is assigned to the time slot 210) to be aware of the surrounding initiators 110 and responders 120. The initiator 110 then transmit the necessary action function to the surrounding initiators 110 and responders 120 at function 240. In the example mining environment, the function 240 is a ranging process for determining relative distances between the initiator 110 and the surrounding initiators 110 and responders 120. Such a ranging process also determines the relative locations of the surrounding initiators 110 and responders 120.

For ease of reference, the present disclosure uses the same reference numeral of the time period when referring to the message associated with that time period. For example, the reference numeral 220 is used to represent the block sync message itself and also the time period in which the block sync message is sent.

Figure 2C:
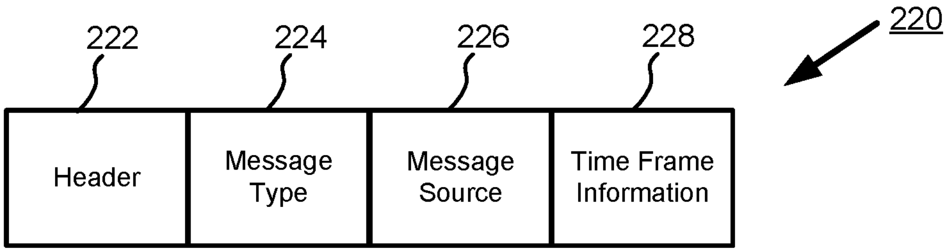

FIG. 2C shows that the data structure of block sync message 220 of header 222, message type 224, message source 226, and time frame information 228. FIG. 2C is not drawn to scale, and the header 222, message type 224, message source 226, and time frame information 228 do not have the same length.

The header 222 is generated with a format having information such as personal area network identification (PAN ID), data frame structure, and the like. The message type 224 is a single byte to indicate the message type. The message source 226 includes 2-6 bytes indicating the identification of the UWB device (i.e., the initiator 110 assigned to the time slot 210) that is sending the block sync message 220.

The time frame information 228 includes data blocks, namely time frame identification 228A, current time slot index 228B, and time slot information 228CA to 228CN. The time frame identification 228A is the data block in which the priority level of the time frame 200 is indicated. The current time slot index 228B is the data block in which the position of the current time slot (e.g., time slot 210B) within the time frame 200 is indicated.

Time slot information 228CA to 228CN are the data blocks indicating the assignment between the respective initiators 110 and the respective time slots 210A to 210N. Each time slot information 228CA to 228CN is also used to indicate the expiry of the assignment between an initiator 110 and that time slot 210.

For example, time slot 210A is assigned to initiator 110A and this assignment expires after 10 more cycles of time frame 200. Therefore, at time slot information 228CA, a signal is transmitted indicating the assignment of time slot 210A to initiator 110A and that the assignment expires in 10 cycles.

Each initiator 110 stores a copy of the time frame information 228. However, as the system 100 does not have a centralized controller, the time frame information 228 stored at one initiator 110 may be different to the time frame information 228 stored at another initiator 110. A method to resolve such a difference will be discussed hereinafter in relation to FIGS. 4A, 4B, and 5A.

The initiator 110 has two modes: listening mode and active mode. In the listening mode, an initiator 110 listens to any block sync messages 220 sent by any other initiators 110. The method 300 (shown in FIG. 3) is executed when the initiator 110 is in the listening mode. The methods described hereinafter are methods to operate an ad-hoc wireless network in accordance with the present disclosure.

In the active mode, the initiator 110 is capable of receiving block sync messages 220 from other initiators 110. The method 400 (shown in FIGS. 4A and 4B) is executed when the initiator 110 receives any block sync messages 220 from other initiators 110. In the active mode, an initiator 110 also has a time slot 210 selected in which to transmit a block sync message 220 and perform a function (e.g., a ranging process). The method 500 (shown in FIG. 5A) is executed when the initiator 110 is transmitting a block sync message 220 at a selected time slot 210. FIG. 5B is executed to perform a ranging process (i.e., an example action of the function 240).

Figure 3:
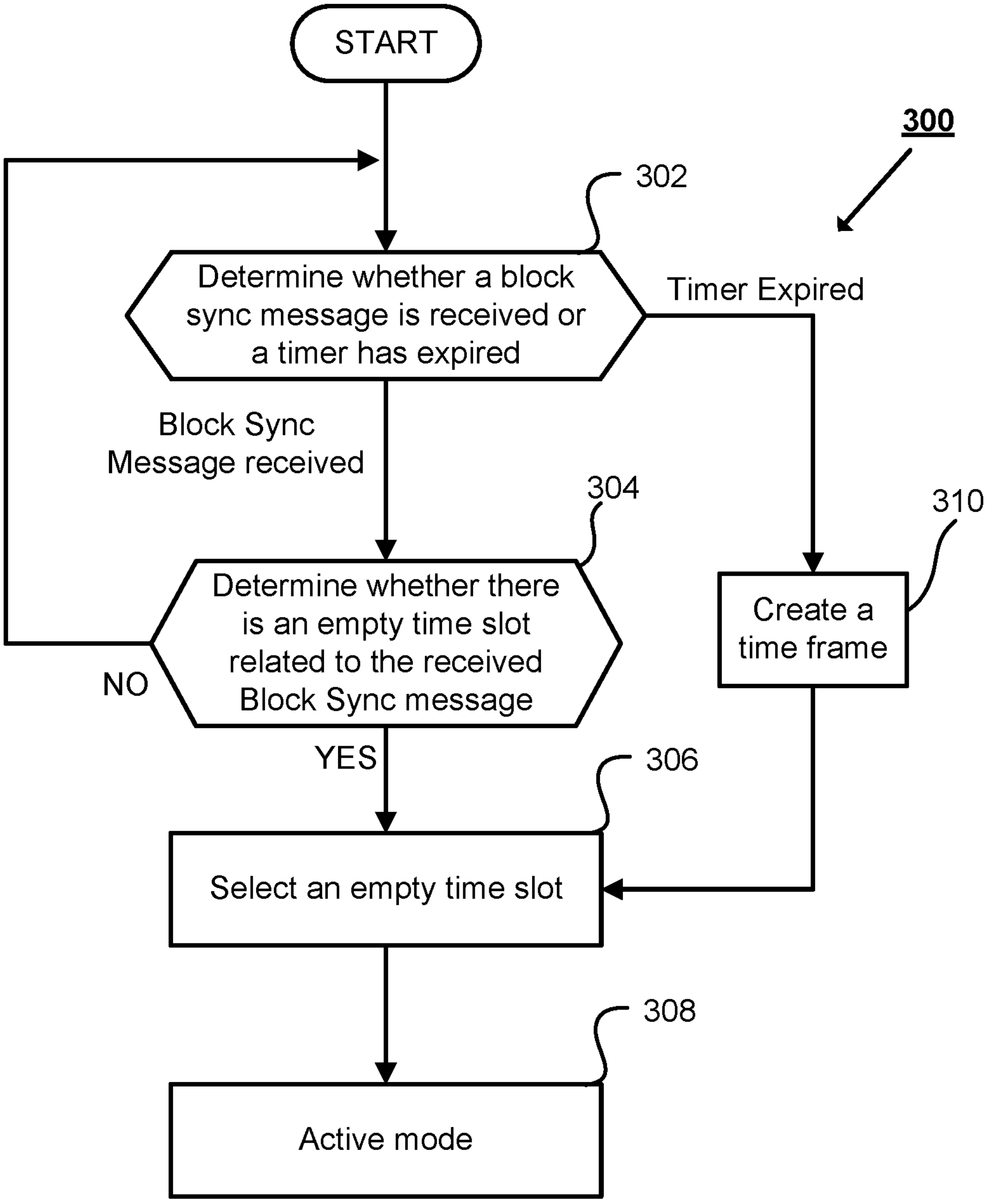
FIG. 3 is a flowchart of a method to be executed when a UWB device is in the listening mode.

FIG. 3 is the method 300 executed by an initiator 110 in listening mode. The method 300 is executed by a computer application program 1333 executable within the embedded controller 1302 (described below in relation to FIGS. 8A and 8B) of the initiator 110.

An initiator 110 enters the listening mode when the initiator 110 is initially turned on. An initiator 110 also enters listening mode when certain circumstances occur, as will be described hereinafter.

The method 300 commences at step 302 by determining whether the initiator 110 has received a block sync message 220 from any other initiators 110 or a timer has expired. The initiator 110 has a timer that is triggered when the initiator 110 enters the listening mode. In one arrangement, the timer is a 2 second timer.

If a block sync message 220 is received from other initiators 110, the method 300 proceeds from step 302 to step 304. Otherwise, if the timer expires, the method 300 proceeds from step 302 to step 310.

Figure 2D:
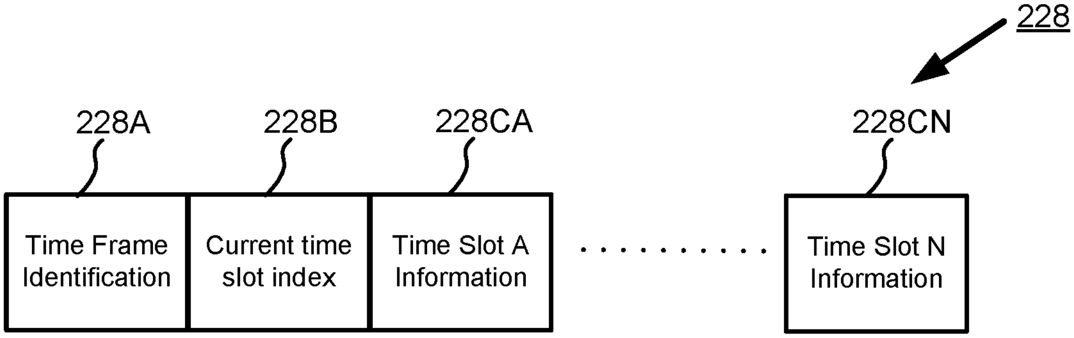

In step 304, the method 300 determines whether there is an empty time slot 210 within the time frame 200 of the received block sync message 220. As discussed in relation to FIGS. 2B to 2D, the block sync message 220 includes the time frame information 228 having the time slot information 228CA to 228CN. Accordingly, the initiator 110 decodes the time frame slot information 228CA to 228CN to determine whether there are any unassigned time slots 210. If there are any empty time slots 210 (YES), the method 300 proceeds from step 304 to step 306. Otherwise, if there is no empty time slot 210 (NO), the method 300 proceeds from step 304 to step 302.

As discussed above, the method 300 proceeds from step 302 to step 310 when the time expires. In step 310, the method 300 creates a time frame 200 where the time slots 210 are unassigned. The created time frame 200 is stored in memory 1309 of the initiator 110 (see FIGS. 8A and 8B and associated description). The method 300 then proceeds from step 310 to step 306.

In step 306, the method 300 selects an empty time slot 210 and proceeds to step 308.

In step 308, the initiator 110 enters the active mode. The method 300 concludes at the conclusion of step 308.

As described above, the method 400 of FIGS. 4A and 4B is executed by the initiator 110 when receiving block sync messages 220 from other initiators 110. The method 400 is executed by a firmware 1333 executable within the embedded controller 1302 (described below in relation to FIGS. 8A and 8B) of the initiator 110.

Figure 4A:
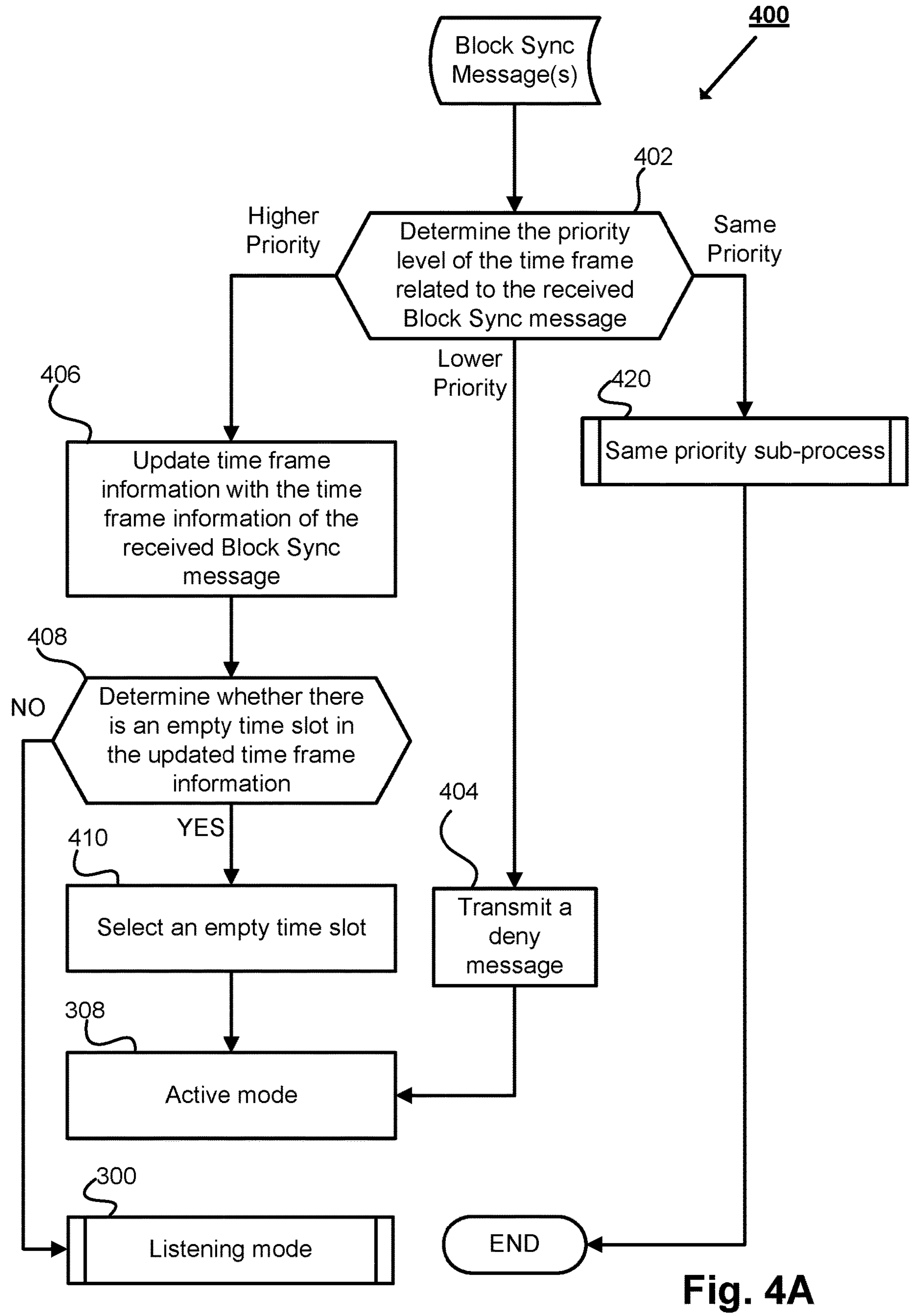
FIGS. 4A and 4B show flowcharts of a method to process received block sync message(s) by a UWB device in the active mode.
Figure 5A:
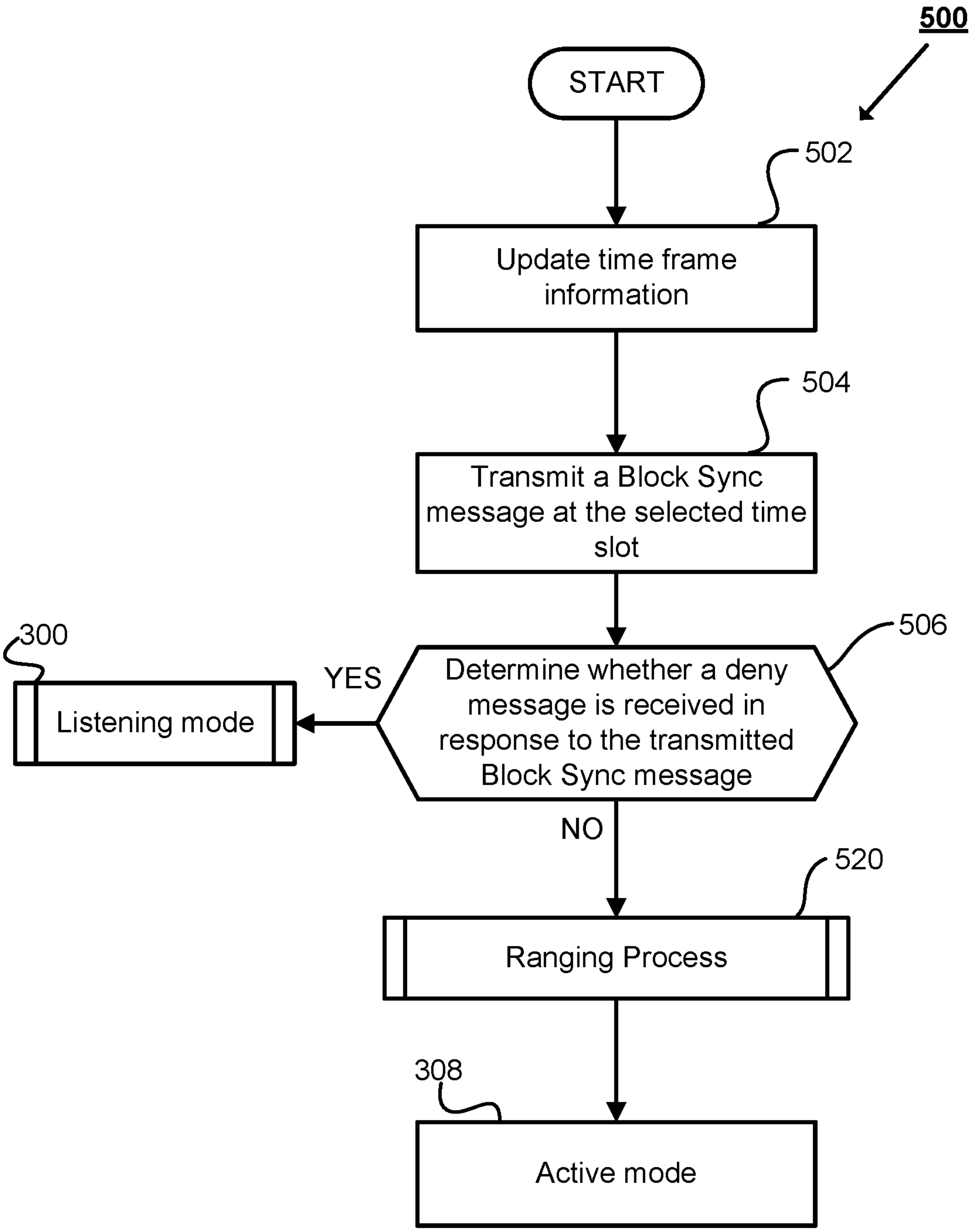
FIG. 5A illustrates a flowchart of a method of transmitting a block sync message by a UWB device in the active mode.
Figure 5B:
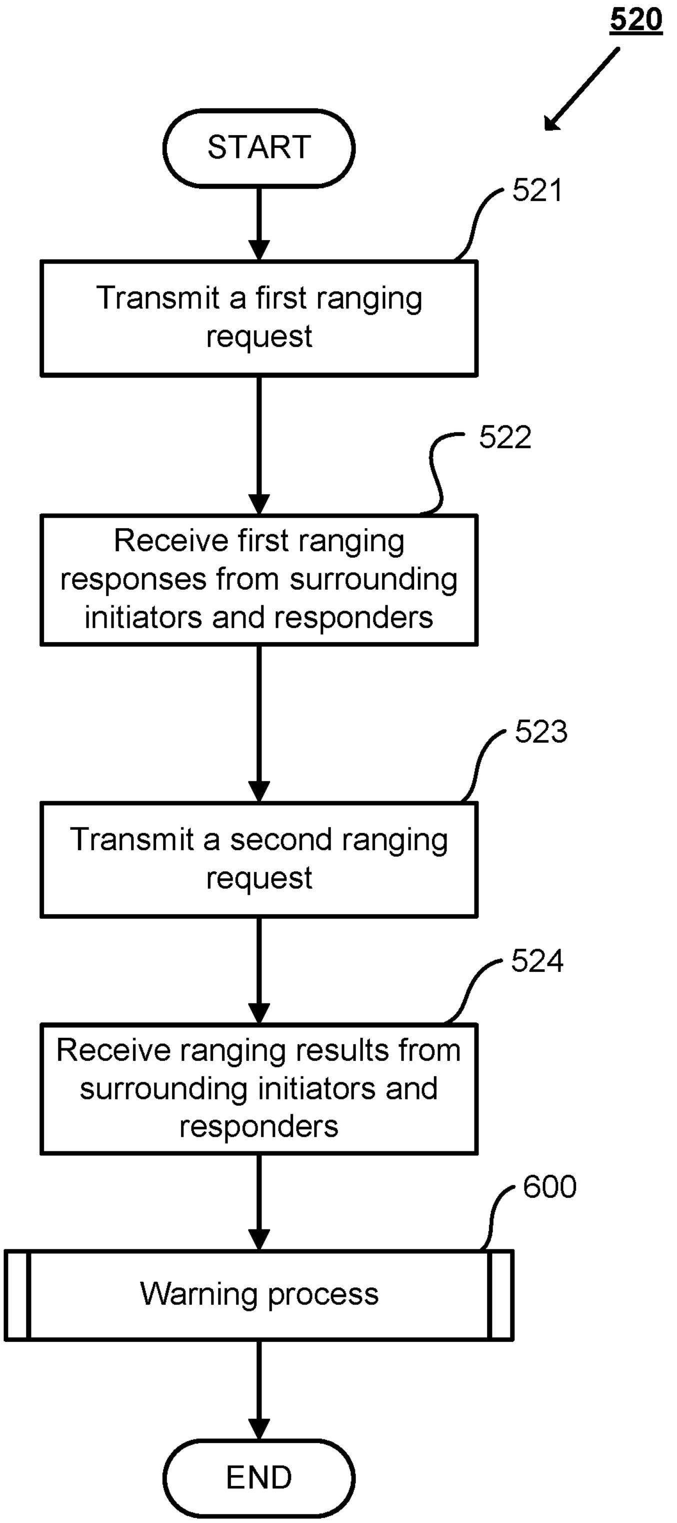
FIG. 5B is a flowchart of a sub-process for performing a ranging process.
Figure 6:
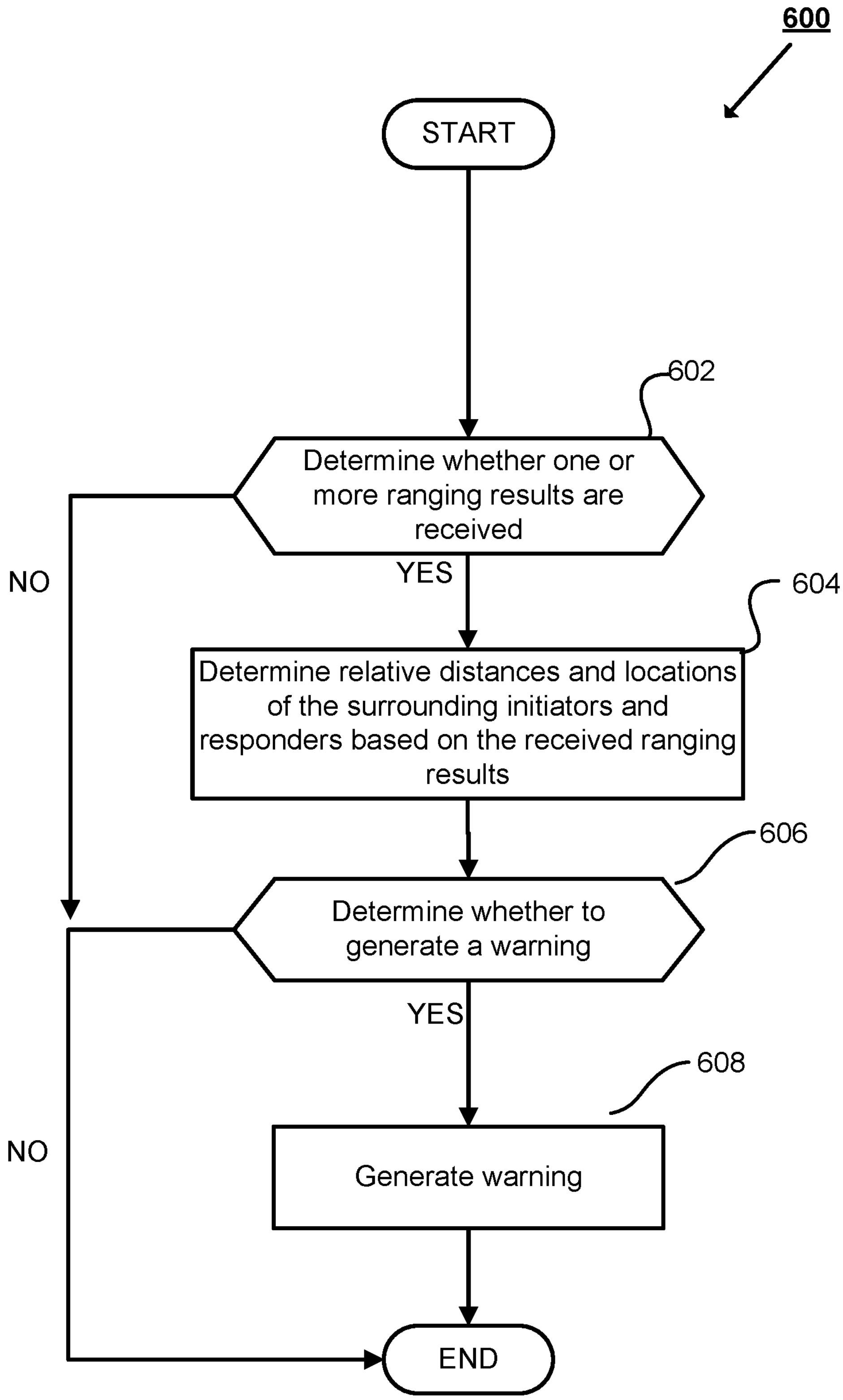
FIG. 6 is a flowchart of a method to generate a warning.

The method 400 is executed when the initiator 110 receives block sync message(s) 220 from other initiators 110, shown in FIG. 4A. Once the block sync message(s) 220 are received, the method 400 commences at step 402 by determining the priority levels of the time frames 200 of the received block sync messages 220. As described above, the priority level of the time frame 200 is signalled in the data block represented by the time frame identification 228A. In one arrangement, the priority level is set to the number of initiators 110 assigned to the time frame 200. For example, if initiator 110A is assigned to time slot 210B of a time frame 200 and the remaining time slots 210A and 210C to 210D are unassigned, then the priority level of the time frame 200 is 1. If time slots 210C and 210D are subsequently assigned to other initiators 110, then the priority level of the time frame 200 becomes 3. The priority level is used to resolve differences between different time frames 200.

In one arrangement, the method 400 waits for a period of time to allow further block sync messages 220 to be received.

Once the priority level of a received block sync message 220 is determined, there are three possible scenarios:

1. The priority level of the block sync message 220 received is higher than the priority level of the time frame 200 of the initiator 110 executing the method 400;
2. The priority level of the block sync message 220 received is the same as the priority level of the time frame 200 of the initiator 110 executing the method 400; and
3. The priority level of the block sync message 220 received is lower than the priority level of the time frame 200 of the initiator 110 executing the method 400.

In the first scenario (Higher Priority), the method 400 proceeds from step 402 to step 406.

In the second scenario (Same Priority), the method 400 from step 402 to sub-process 420.

In the third scenario (Lower Priority), the method 400 proceeds from step 402 to step 404.

In step 406, the method 400 updates the time frame information 228 of the initiator 110 executing the method 400 with the time frame information 228 of the received block sync message 220 with the highest priority level. In other words, the initiator 110 executing the method 400 now stores the same time frame information 228 as the time frame information 228 of the received block sync message 220. The method 400 then proceeds from step 406 to step 408.

In step 408, the method 400 determines whether there is an empty time slot in the updated time frame information 228. If there are any empty time slots 210 (YES), the method 400 proceeds from step 408 to step 410. Otherwise, if there is no empty time slot 210 (NO), the method 400 proceeds from step 408 to the method 300 (i.e., listening mode) to put the initiator 110 into the listening mode.

In step 410, the method 400 selects an empty time slot 210 and proceeds to step 308.

In step 308, the initiator 110 enters the active mode. The method 400 concludes at the conclusion of step 308.

As described above, the third scenario proceeds from step 402 to step 404. In step 404, the method 400 transmits a deny message responding to the received block sync messages 220. The method 400 then proceeds from step 404 to step 308.

Figure 4B:
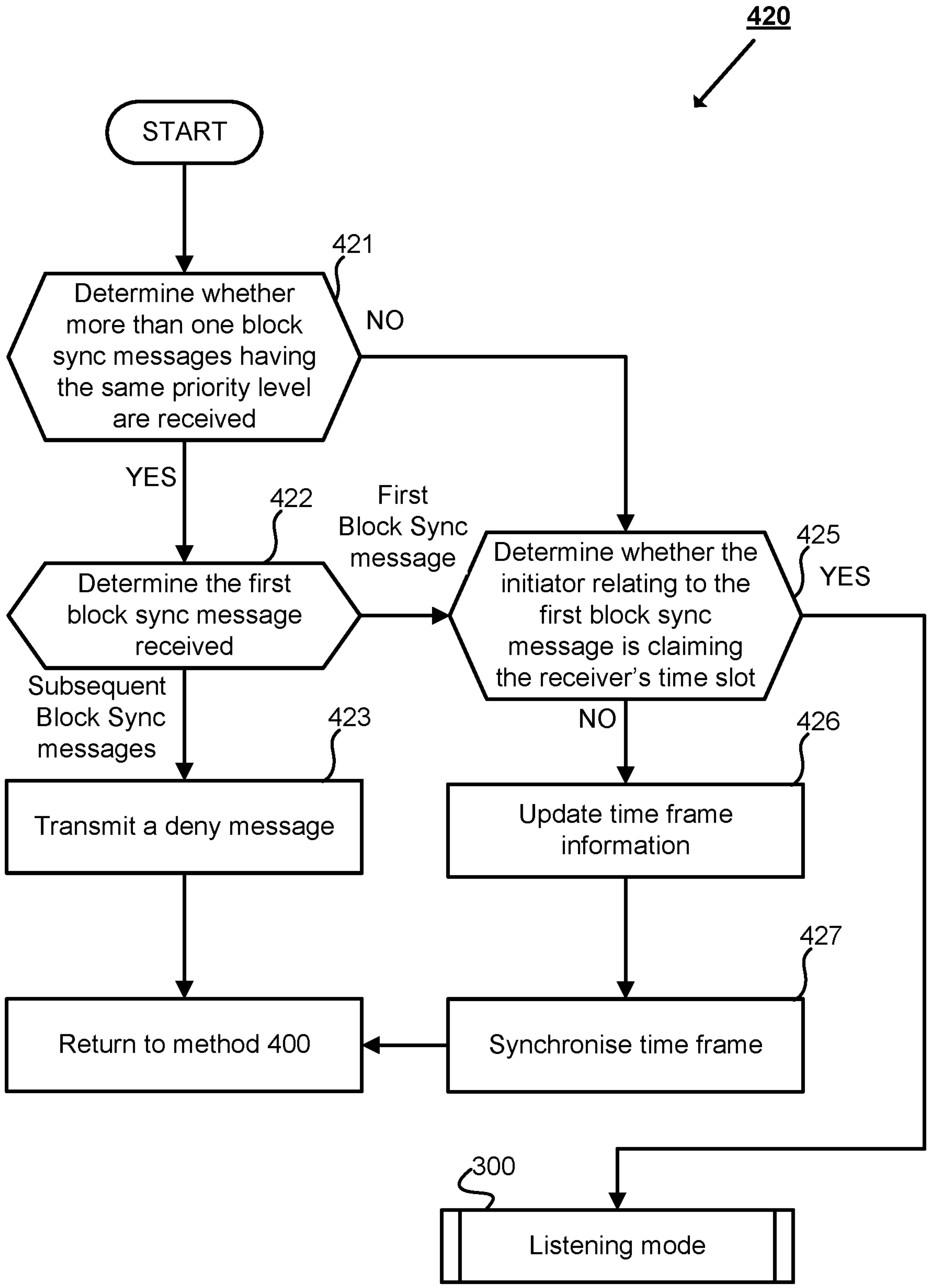

As described above, the second scenario proceeds to sub-process 420. The flowchart of sub-process 420 is illustrated in FIG. 4B. The sub-process 420 is executed by a firmware 1333 executable within the embedded controller 1302 (described below in relation to FIGS. 8A and 8B) of the initiator 110.

Sub-process 420 commences at step 412 by determining whether more than one block sync messages 220 having the same priority level are received. If there are more than one block sync messages 220 (YES), sub-process 420 proceeds from step 421 to step 422. Otherwise (NO), sub-process 420 proceeds from step 421 to step 425.

In step 422, sub-process 420 determines the first block sync message 220 (having the same priority level) that is received by the initiator 110 executing the sub-process 420. Sub-process 420 proceeds from step 422 to step 425 for the first block sync message 220. Sub-process 420 proceeds from step 422 to step 423 for the remaining block sync messages 220.

In step 423, sub-process 420 transmits a deny message for the remaining block sync messages 220. Sub-process 420 then concludes and returns to the method 400.

In step 425, sub-process 420 determines whether the initiator 110 relating to the first block sync message 220 is claiming the time slot 210 that is selected by the initiator 110 executing sub-process 420. If so (YES), sub-process 420 proceeds from step 425 to the method 300 (i.e., listening mode) to put the initiator 110 into the listening mode. If not (NO), sub-process 420 proceeds from step 425 to step 426.

In step 426, sub-process 420 updates the time frame information 228 of the initiator 110 executing sub-process 420 with the time frame information 228 of the received block sync message 220. In one arrangement, the initiator 110 copies the time slot information 228CA to 228CN from the received block sync message 220.

In an alternative arrangement, the initiator 110 first determines the time slot information 228CA to 228CN from the received block sync message 220 and, for any time slot information 228C that are different, adopts the time slot information 228C from the received block sync message 220. For example, if the assignment of a time slot information 228C of the received block sync message 220 is the same as time slot information 228C stored in the initiator 110 but the expiry information is different, the initiator 110 stores the expiry information of the received block sync message 220 in the time slot information 228C. In this example, the time slot information 228CA of the block sync message 220 has an expiry information of 10 cycles, while the time slot information 228CA of the initiator 110 has an expiry information of 9 cycles. The initiator 110 updates the time frame information 228 by updating the expiry information of time slot information 228CA to 10 cycles. Sub-process 420 then proceeds from step 426 to step 427.

In step 427, sub-process 420 synchronizes the time frame 200 of the initiator 110 executing sub-process 420 with the received time of the first block sync message 220. Sub-process 420 returns to the method 400.

As described above, the active mode also enables an initiator 110 to transmit a block sync message 220 in order to perform a function. In this case, the function performed is a ranging process to determine the relative distances between the initiator 110 and other initiators 110 and responders 120. The transmission of a block sync message 220 and a ranging request is shown in a flowchart of the method 500 (shown in FIGS. 5A and 5B). The method 500 is executed by a firmware 1333 executable within the embedded controller 1302 (described below in relation to FIGS. 8A and 8B) of the initiator 110.

The method 500 commences at step 502 by updating the time frame information 228. In particular, the method 500 updates the time slot information 228C (e.g., 228CA to 228CN) that is selected by the initiator 110 executing the method 500. The update to the time slot information 228C involves reducing the number of cycles to expiry of the assignment of the initiator 110 to the particular time slot 210.

For example, if the expiry is 10 cycles, then at step 502 the number of cycle is reduced to 9. If the number of expiry is reduced to 0, the assignment is removed. Accordingly, the priority level of the time frame 200 is also updated to reflect the current number of assignments of time slots 210 of the time frame 200.

The method 500 then proceeds from step 502 to step 504.

In step 504, the initiator 110 executing the method 500 transmits a block sync message 220 at the selected time slot 210. The method 500 then proceeds from step 504 to step 506.

In step 506, the method 500 determines whether a deny message is received in response to the transmitted block sync message. If a deny message is received (YES), the method 500 proceeds from step 506 to the method 300 (i.e., listening mode) so that the initiator 110 executing the method 500 is put into the listening mode. Otherwise (NO), the method 500 proceeds from step 506 to sub-process 520.

Sub-process 520 (shown in FIG. 5B) is a ranging process used in the example mining environment and is sent in the time period called function 240. Sub-process 520 is executed by a firmware 1333 executable within the embedded controller 1302 (described below in relation to FIGS. 8A and 8B) of the initiator 110. Sub-process 520 may perform other relevant functions as required by the initiators 110 and responders 120 in different environments.

Sub-process 520 commences at step 521 by transmitting a first ranging request. As described above, the initiator 110 executing sub-process 520 transmits the ranging request at its selected time slot 210. For example, if time slot 210B is selected by the initiator 110, then the initiator 110 transmits the ranging request within the time period of function 240 within the time slot 210B. The ranging request also includes a list of the identification numbers of the surrounding initiators 110 and responders 120 in the ranging request. The identification numbers of the surrounding initiators 110 and responders 120 are obtained when receiving the acknowledgement messages within the time period of ack 230. Sub-process 520 then proceeds from step 521 to step 522.

In step 522, sub-process 520 receives first ranging responses from the surrounding initiators 110 and responders 120. When the first ranging responses are received, corresponding receiving timestamps are generated for the respective first ranging responses. Sub-process 520 then proceeds from step 522 to step 523.

In step 523, sub-process 520 transmits a second ranging request having the transmitting timestamp of the first ranging request, the transmitting timestamp of the second ranging request, and the receiving timestamps of the first ranging responses. Sub-process 520 then proceeds from step 523 to step 524.

In step 524, sub-process 520 receives ranging results from the surrounding initiators 110 and responders 120. Each ranging result includes a determined relative distance between the initiator 110 and one of the surrounding initiators 110 or responders 120. The ranging results are calculated by the respective surrounding initiators 110 and responders 120 receiving the second ranging request, as discussed below in relation to step 708 of the method 700. Sub-process 520 then proceeds from step 524 to warning sub-process 600.

Sub-process 600 is executed by a firmware 1333 executable within the embedded controller 1302 (described below in relation to FIGS. 8A and 8B) of the initiator 110. In another arrangement, sub-process 600 is executed by a central controller (not shown) that is connected to multiple initiators 110 disposed on one object. As described in an example above, a large mining vehicle may have multiple initiators 110. In this example, the large mining vehicle may use a central controller connected to those initiators 110. In yet another arrangement, one of the embedded controllers 1302 of the multiple initiators 110 acts as a central controller. If any of the other arrangements are implemented, the ranging results received at step 524 are first transmitted to the central controller before executing sub-process 600.

Sub-process 600 commences at step 602 by determining whether one or more ranging results are received. If no ranging results are received (NO), sub-process 600 concludes at the conclusion of step 602. Otherwise (YES), sub-process 600 proceeds from step 602 to step 604.

In step 604, sub-process 600 determines the relative distances and relative locations of the surrounding initiators 110 and responders 120 based on the ranging results. The relative locations are determined using a trilateration algorithm. In the example above where multiple initiators 110 are disposed on one object (e.g., a large mining vehicle), then the initiator 110 determining the relative locations of surrounding initiators 110 and responders 120 removes the ranging results from the other initiators 110 disposed on the same object. Sub-process 600 proceeds from step 604 to step 606.

In step 606, sub-process 600 determines whether to generate a warning based on the determined relative distances and relative locations. As described above, there are multiple arrangements to use the initiators 110. The first arrangement has one initiator 110 executing sub-process 600. The second arrangement has multiple initiators 110 being disposed on an object (e.g., a large mining vehicle) where a central controller (not shown) is executing sub-process 600. The third arrangement is similar to the second arrangement but one of the multiple initiators 110 is acting as a central controller to execute sub-process 600.

For the first arrangement, the generation of a warning is determined based on the relative distance. The initiator 110 defines a warning zone with a certain radius. The relative distance from any miner (with a responder 120) or other vehicles (with other initiators 110) smaller than the defined radius of the warning zone triggers the warning.

For the second and third arrangements, the warning is triggered based on both the relative distance and location. The central controller estimates the relative location of a responder 120 or an initiator 110 disposed on another vehicle using a trilateration algorithm. The warning is then generated based on the risk of collision. If the estimated location of a responder 120 or an initiator 110 is ahead of the current object (e.g., a mining vehicle), the warning is triggered if the relative distance is closer than a first predetermined distance (e.g., 20 metres). If the responder 120 or the other initiator 110 is estimated to be parallel to or behind the initiator 110, the warning is triggered if the relative distance is closer than a second predetermined distance (e.g., 10 metres). Accordingly, the first predetermined distance is farther than the second predetermined distance to allow for the movement of the initiator 110 toward the responder 120 or other initiator 110. If a warning is to be generated (YES), sub-process 600 proceeds from step 606 to step 608. Otherwise (NO), sub-process 600 concludes at the conclusion of step 606.

In step 608, the initiator 110 executing sub-process 600 generates a warning. Sub-process 600 concludes at the conclusion of step 608. At the conclusion of sub-process 600, the process returns to sub-process 520, which in turn returns to the method 500. The method 500 then returns the initiator 110 to the active mode.

Figure 7:
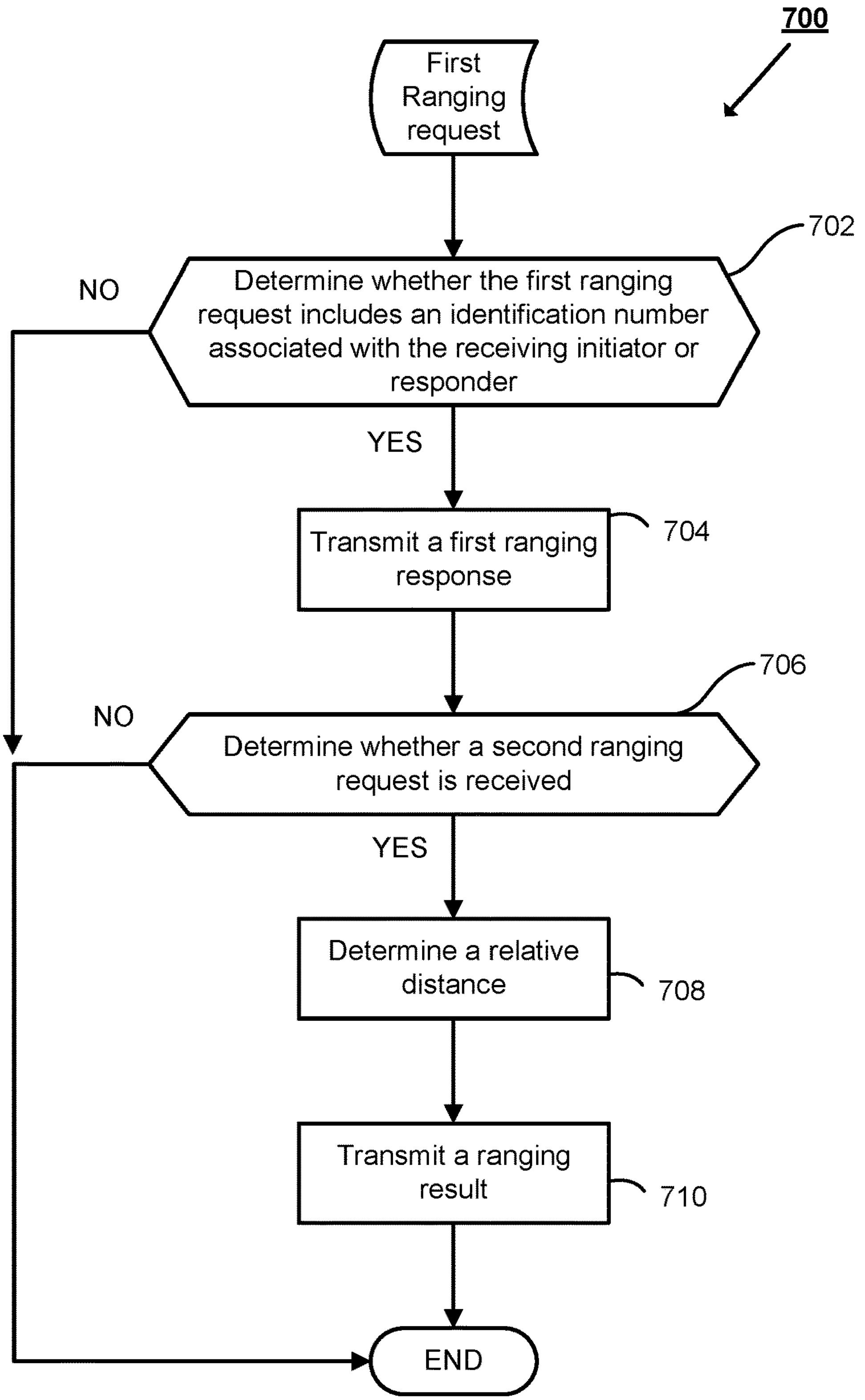
FIG. 7 is a flowchart of a method to process a received ranging request.

FIG. 7 is a flowchart showing a method 700 of responding to a received first ranging request. The method 700 is executed by either an initiator 110 or a responder 120.

Method 700 commences when a first ranging request is received. The method 700 commences at step 702 by determining whether an identification number associated with the initiator 110 or responder 120 (executing the method 700) is listed in the first ranging request. For example, if an initiator 110C having an identification number of 110C receives a first ranging request, the initiator 110C determines at step 702 whether an identification number 110C is listed in the first ranging request. If the associated identification number is not listed (NO), method 700 concludes at the conclusion of step 702. If the associated identification number is listed (YES), method 700 proceeds from step 702 to step 704.

In step 704, the method 700 transmits a first ranging response having the identification number of the initiator 110 or responder 120 executing the method 700. The transmitting timestamp of the first ranging response is recorded. Method 700 then proceeds from step 704 to step 706.

In step 706, method 700 determines whether a second ranging request is received. If a second ranging request is not received (NO), method 700 concludes at the conclusion of step 706. If a second ranging request is received (YES), method 700 proceeds from step 706 to step 708.

In step 708, method 700 determines the relative distance from the initiator 110 or responder 120 executing the method 700 to the initiator 110 transmitting the second ranging request. The relative distance is determined using the transmitting timestamp of the first ranging response (see step 704), transmitting timestamp of the first ranging request, the transmitting timestamp of the second ranging request, and the receiving timestamp of the first ranging response for this particular initiator 110 or responder 120 (where the latter three timestamps are included in the second ranging request).

Distance between an initiator 110 and a response 120 or another initiator 110 can be calculated if the time of flight (TOF) of a signal is determined. However, a single signal (i.e., the first ranging request or the first ranging response) is insufficient as the clock of the initiator 110 and the responder 120 or the other initiator 110 are not synchronized. According, the TOF is obtained by determining the time differences between the transmission and receipt of the first ranging request and the first ranging response. The second ranging request provides more time differences enabling a better TOF estimation by reducing errors due to the time clock differences. The method 700 then proceeds from step 708 to step 710.

In step 710, the method 700 transmits a ranging result including the determined relative distance. The method 700 then concludes at the conclusion of step 710.

Embedded Electronic Device Description

Figure 8A:
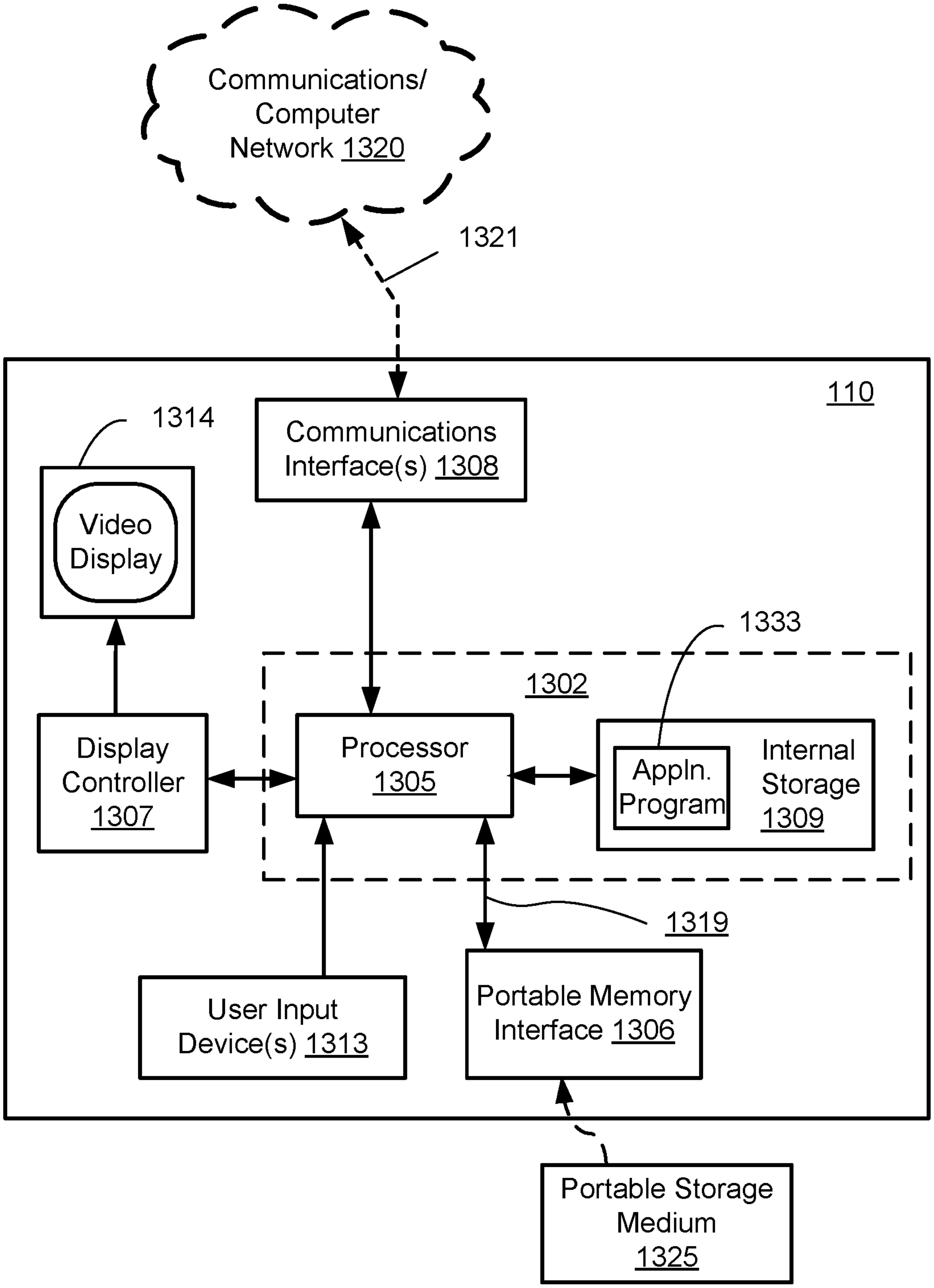
FIGS. 8A and 8B collectively form a schematic block diagram representation of a UWB device upon which described arrangements can be practised.
Figure 8B:
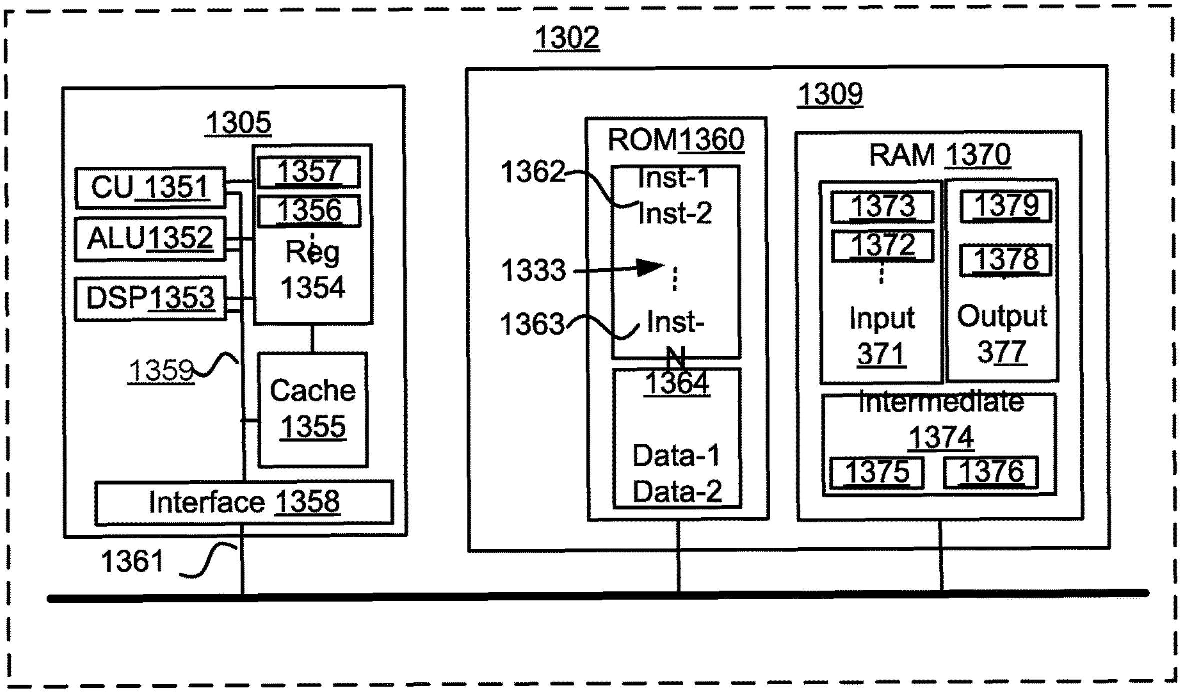

FIGS. 8A and 8B collectively form a schematic block diagram of the initiator 110 including embedded components, upon which the ad-hoc wireless communication methods described above are desirably practiced. In an alternative arrangement, the methods described above may also be performed on higher-level devices such as desktop computers, server computers, and other such devices with significantly larger processing resources.

As seen in FIG. 8A, the initiator 110 comprises an embedded controller 1302. Accordingly, the initiator 110 may be referred to as an "embedded device." In the present example, the controller 1302 has a processing unit (or processor) 1305 which is bi-directionally coupled to an internal storage module 1309. The storage module 1309 may be formed from non-volatile semiconductor read only memory (ROM) 1360 and semiconductor random access memory (RAM) 1370, as seen in FIG. 8B. The RAM 1370 may be volatile, non-volatile or a combination of volatile and non-volatile memory.

The initiator 110 includes a display controller 1307, which is connected to a video display 1314, such as a liquid crystal display (LCD) panel or the like. The display controller 1307 is configured for displaying graphical images on the video display 1314 in accordance with instructions received from the embedded controller 1302, to which the display controller 1307 is connected.

The initiator 110 also includes user input devices 1313 which are typically formed by keys, a keypad or like controls. In some implementations, the user input devices 1313 may include a touch sensitive panel physically associated with the display 1314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 8A, the initiator 110 also comprises a portable memory interface 1306, which is coupled to the processor 1305 via a connection 1319. The portable memory interface 1306 allows a complementary portable memory device 1325 to be coupled to the initiator 110 to act as a source or destination of data or to supplement the internal storage module 1309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The initiator 110 also has a communications interface 1308 to permit coupling of the device 1301 to a computer or communications network 1320 via a connection 1321. The connection 1321 may be wired or wireless. For example, the connection 1321 may be radio frequency or optical. An example of a wired connection includes Ethernet. Further, an example of wireless connection includes Bluetooth™ type local interconnection, UWB, Wi-Fi (including protocols based on the standards of the IEEE 802.11 family), Infrared Data Association (IrDa) and the like.

As described above, the initiator 110 is configured to communicate with other initiators 110 and responders 120. The embedded controller 1302 is provided to perform the method 300 to 700 described above.

The methods described hereinbefore may be implemented using the embedded controller 1302, where the processes of FIGS. 3 to 7 may be implemented as one or more software application programs 1333 executable within the embedded controller 1302. The initiator 110 of FIG. 8A implements the described methods. In particular, with reference to FIG. 8B, the steps of the described methods are effected by instructions in the software 1333 that are carried out within the controller 1302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1333 of the embedded controller 1302 is typically stored in the non-volatile ROM 1360 of the internal storage module 1309. The software 1333 stored in the ROM 1360 can be updated when required from a computer readable medium. The software 1333 can be loaded into and executed by the processor 1305. In some instances, the processor 1305 may execute software instructions that are located in RAM 1370. Software instructions may be loaded into the RAM 1370 by the processor 1305 initiating a copy of one or more code modules from ROM 1360 into RAM 1370. Alternatively, the software instructions of one or more code modules may be pre-installed in a non-volatile region of RAM 1370 by a manufacturer. After one or more code modules have been located in RAM 1370, the processor 1305 may execute software instructions of the one or more code modules.

The application program 1333 is typically pre-installed and stored in the ROM 1360 by a manufacturer, prior to distribution of the electronic device 1301. However, in some instances, the application programs 1333 may be supplied to the user encoded on one or more CD-ROM (not shown) and read via the portable memory interface 1306 of FIG. 8A prior to storage in the internal storage module 1309 or in the portable memory 1325. In another alternative, the software application program 1333 may be read by the processor 1305 from the network 1320, or loaded into the controller 1302 or the portable storage medium 1325 from other computer readable media. Computer readable storage media refers to any non-transitory tangible storage medium that participates in providing instructions and/or data to the controller 1302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1301. Examples of transitory or non-tangible computer readable transmission media that may also participate in the provision of software, application programs, instructions and/or data to the device 1301 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1333 and the corresponding code modules mentioned above may be executed to implement one or more graphical user interfaces (GUIs) to be rendered or otherwise represented upon the display 1314 of FIG. 8A. Through manipulation of the user input device 1313 (e.g., the keypad), a user of the device 1301 and the application programs 1333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 8B illustrates in detail the embedded controller 1302 having the processor 1305 for executing the application programs 1333 and the internal storage 1309. The internal storage 1309 comprises read only memory (ROM) 1360 and random access memory (RAM) 1370. The processor 1305 is able to execute the application programs 1333 stored in one or both of the connected memories 1360 and 1370. When the initiator 110 is initially powered up, a system program resident in the ROM 1360 is executed. The application program 1333 permanently stored in the ROM 1360 is sometimes referred to as "firmware". Execution of the firmware by the processor 1305 may fulfil various functions, including processor management, memory management, device management, storage management and user interface.

The processor 1305 typically includes a number of functional modules including a control unit (CU) 1351, an arithmetic logic unit (ALU) 1352, a digital signal processor (DSP) 1353 and a local or internal memory comprising a set of registers 1354 which typically contain atomic data elements 1356, 1357, along with internal buffer or cache memory 1355. One or more internal buses 1359 interconnect these functional modules. The processor 1305 typically also has one or more interfaces 1358 for communicating with external devices via system bus 1381, using a connection 1361.

The application program 1333 includes a sequence of instructions 1362 though 1363 that may include conditional branch and loop instructions. The program 1333 may also include data, which is used in execution of the program 1333. This data may be stored as part of the instruction or in a separate location 1364 within the ROM 1360 or RAM 1370.

In general, the processor 1305 is given a set of instructions, which are executed therein. This set of instructions may be organised into blocks, which perform specific tasks or handle specific events that occur in the electronic device 1301. Typically, the application program 1333 waits for events and subsequently executes the block of code associated with that event. Events may be triggered in response to input from a user, via the user input devices 1313 of FIG. 8A, as detected by the processor 1305. Events may also be triggered in response to other sensors and interfaces in the electronic device 1301.

The execution of a set of the instructions may require numeric variables to be read and modified. Such numeric variables are stored in the RAM 1370. The disclosed method uses input variables 1371 that are stored in known locations 1372, 1373 in the memory 1370. The input variables 1371 are processed to produce output variables 1377 that are stored in known locations 1378, 1379 in the memory 1370. Intermediate variables 1374 may be stored in additional memory locations in locations 1375, 1376 of the memory 1370. Alternatively, some intermediate variables may only exist in the registers 1354 of the processor 1305.

The execution of a sequence of instructions is achieved in the processor 1305 by repeated application of a fetch-execute cycle. The control unit 1351 of the processor 1305 maintains a register called the program counter, which contains the address in ROM 1360 or RAM 1370 of the next instruction to be executed. At the start of the fetch execute cycle, the contents of the memory address indexed by the program counter is loaded into the control unit 1351. The instruction thus loaded controls the subsequent operation of the processor 1305, causing for example, data to be loaded from ROM memory 1360 into processor registers 1354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1333, and is performed by repeated execution of a fetch-execute cycle in the processor 1305 or similar programmatic operation of other independent processor blocks in the electronic device 1301.

INDUSTRIAL APPLICABILITY

The arrangements described are applicable to the wireless communication industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of transmitting and receiving data between devices via an ad-hoc wireless communication network, the ad-hoc wireless network using a time frame having time slots, each of the time slots is assignable to one of the devices so that a device assigned to a time slot transmits and receives the data at the assigned time slot, the time frame being created by one of the devices;

wherein the time frame comprises a priority level, the priority level of the time frame being used to resolve differences between different time frames;

wherein the data transmitted and received in a time slot includes any one of information on the time frame, acknowledgment of the information of the time frame, and function to be performed, wherein the information of the time frame comprises the priority level and information on the time slots of the time frame.

2. The method of claim 1, wherein the created time frame is stored in memory of each of the devices.

3. The method of claim 2, when a device having the stored time frame receives the data, the device synchronizes the stored time frame with a time that the data is received.

4. The method of claim 1, wherein the priority level is based on a number of devices assigned to the time slots of the time frame.

5. The method of claim 1, wherein the time frame spans a period of time and repeats after the period of time.

6. The method of claim 1, wherein the function to be performed comprises a ranging process to determine a relative distance between one of the devices to another one of the devices.

7. The method of claim 1, wherein a device selects one of the time slots of the time frame based on the information of the time frame of the received data.

8. A computer program product executable by a processor, the computer program product comprising instructions stored on a non-transitory computer-readable storage medium for performing a method of transmitting and receiving data between devices via an ad-hoc wireless communication network, the ad-hoc wireless network using a time frame having time slots, each of the time slots is assignable to one of the devices so that a device assigned to a time slot transmits and receives the data at the assigned time slot, the time frame being created by one of the devices;

wherein the time frame comprises a priority level, the priority level of the time frame being used to resolve differences between different time frames;

wherein the data transmitted and received in a time slot includes any one of information on the time frame, acknowledgment of the information of the time frame, and function to be performed, wherein the information of the time frame comprises the priority level and information on the time slots of the time frame.

9. The computer program product of claim 8, wherein the created time frame is stored in memory of each of the devices.

10. The computer program product of claim 8, wherein the priority level is based on a number of devices assigned to the time slots of the time frame.

11. The computer program product of claim 8, wherein the time frame spans a period of time and repeats after the period of time.

12. The computer program product of claim 8, wherein the function to be performed comprises a ranging process to determine a relative distance between one of the devices to another one of the devices.

13. The computer program product of claim 8, wherein a device selects one of the time slots of the time frame based on the information of the time frame of the received data.

14. The computer program product of claim 9, when a device having the stored time frame receives the data, the device synchronizes the stored time frame with a time that the data is received.

15. A device, comprising:

a processor; and a memory storing instructions that, when executed by the processor, cause the device to perform the method of claim 1.

* * * * *